3,009,814
PREPARATION OF FROZEN FOODS

Eugene J. Rivoche, 1629 Columbia Road NW., Washington, D.C., assignor to Eugene J. Rivoche and Marie Rivoche, as tenants in common with the right of survivorship
No Drawing. Filed Jan. 27, 1959, Ser. No. 789,268
6 Claims. (Cl. 99—192)

This invention relates to a new and improved method for preparation of frozen food products and has for an object the improvement of the texture and quality of a frozen food product. The main feature of the new method is the introduction of a new step in the conventional process of preparing frozen food products whereby rupture of the cellular structure of the foods due to freezing is diminished. It is particularly advantageous when the food products are of the group of products with high moisture content, such as berries, fruits, and vegetables having generally a delicate texture which is very much affected by freezing and thawing. The disrupture of the texture of the products is due mostly to the transformation of the water content of the products into ice. It is well-known that the larger the ice crystals, the more damage to the texture of the products in the freezing step. It is also known that the faster the freezing step, the smaller are the crystals that are formed, with consequent less damage to the texture of the frozen product. This is the reason that the quick-freezing process is practically universally used. The greatest difficulty in the quick-freezing process is in obtaining fast freezing of the whole mass of the product. What usually happens is that the outer layers of the product are frozen very rapidly, and once frozen they are very poor conductors of heat and it therefore takes relatively longer for the central portion of the product to freeze.

By introduction of the proposed new step of this invention, designated herein as a precooling step, the freezing time can be greatly reduced and a much better frozen product is obtained. This new precooling step consists in cooling the entire mass of the food product, prior to freezing any portion of the food mass, to a temperature between about 0° C. and the freezing temperature of the food being treated. This can be readily done without freezing any of the food because the freezing point of juices of any food product is below 0° C. due to their chemical composition. Moreover, the precooling of the food products, prior to freezing, at temperatures of about 0° C. is very useful in that the frozen product obtained is of much higher quality. Food products so treated can be quick frozen throughout the whole mass in a fraction of the time necessary to freeze a product which has not been precooled.

In my Patent 2,791,508, I have disclosed the advantages of a similar cooling step in preparation of freeze-resistant gels. When the colloidal molecule is formed with water at about 0° C. and the setting of the gel is performed at about 0° C., I have found that gels resistant to freezing are formed, which means that the gel texture is not destroyed upon thawing.

In my Patent 2,520,891, I have disclosed that in cooling cooked potatoes at temperatures between 4° C. and freezing, a kind of delicate sweating action takes place in the cells whereby part of the water leaves the membranes surrounding the cells without breaking them. This water becomes free water between the undamaged cells, and with care it can readily be evacuated either by pressing or centrifuging. I have now found that under such conditions the cooked potato can be frozen without damaging the membrane of the starch grain.

In my new freezing process, the whole mass of the product should be cooled to less than 4° C., and preferably to 0° C. or slightly below, prior to the freezing of any portion of the mass. The precooled mass is then quick-frozen without substantial rise in temperature. In a conventional process, the cooling steps, if any, prior to freezing, are not effective to preserve the texture of the product since the whole mass is not reduced to the 0° C. temperature. Thus, in passing through the freezing state, the included molecules are not retained at 0° C. for a sufficient length of time to permit passage of water from the cells. A water molecule reduced to 0° C. is the closest in size to the same molecule after quick-freezing and, therefore, the damaging result from forming ice is greatly reduced. Nevertheless, it is believed important to remove some of the water from the cell membranes since some expansion does occur during the freezing operation. The membranes are not relieved from the burden of water in the usual quick-freezing operation. It is only when sufficient time is permitted by a cooling operation at about 0° C. that water migrates from the cell through the membranes so that the cell can expand slightly during the freezing operation without being ruptured.

The cooling step is very simple to perform. A very good method is to hold the fruits or vegetables in water or other liquid at 0° C. for the necessary length of time to cool the whole product to 0° C. To lower the freezing point of the water slightly below 0° C., a small amount of sugar or other edible solute may be dissolved in the water bath. Preferably, the cooling bath is prepared so that it has approximately the same specific gravity and composition as the juices in the food product to be cooled. Loss of juices from the product by osmotic action is thereby minimized. Adjustments of solution composition for this purpose may be accomplished by addition of small amounts of sugar, salts, food acids and the like.

The temperature of the cooling process is easily controlled by keeping the water or aqueous liquid covered with a very slight layer of ice, which will maintain the cooling bath at 0° C. or very slightly lower but which is not cold enough to freeze the moisture of the product. The liquid bath process has the advantage of being a very fast-cooling method. Water is a much better medium for the transfer of heat than is air. Therefore, the general cooling effect is much faster and more homogeneous. Another advantage is that during this cooling step in liquid medium, no dehydration takes place and the whole operation is performed under very hygienic conditions. If desired, a disinfectant and/or antioxidant can be added to the cooling bath. After the product is precooled as indicated above, the product is at its maximum hardness, short of freezing.

As mentioned above, the precooled product can be quick-frozen in a small fraction of the time at which it is usually necessary to freeze a product which has not been precooled. For certain products, like cherries and other fruits which require processing steps prior to freezing, the cooling step has another very appreciable advantage. For example, cherries prior to freezing must be pitted. This removal of the seed of the cherry is very damaging, not only to the body of the cherry but causes loss of juice. By handling a very hard, precooled cherry, the damage to the cell membrane due to pitting is much reduced.

A precooled food product—especially cherries, fruit and vegetables—is much more resistant to disruption by freezing and thawing action than one frozen without the cooling process. The frozen product is of a much higher quality, holding up much better after thawing, and is superior in physical texture as well as in losing fewer juices.

The cooling step can also be performed by holding the products in other media such as air or nitrogen, in a cooling chamber with the temperature maintained at 0° C. or slightly below. However, the previously mentioned system has the advantage of being faster and more easily controlled. Cooling calories in a liquid medium are much more easily distributed and an average uniform temperature is much more easily maintained.

Another aid to freezing is partial dehydration of the product prior to quick-freezing. Generally, a partial dehydration of 10 to 20% is sufficient to obtain a frozen product which is much less damaged through the freezing. Care must be taken that the moisture loss is homogeneously obtained throughout the whole mass of the product. It is recommended that after partial dehydration, a sufficient time be allowed before freezing of the product for a partial dehydration of the cells through osmosis. The best results are obtained if the partially dehydrated product is cooled as described above in a cooling chamber. While the predryed product is being cooled to 0° C. in such chamber, another partial dehydration of the cells is obtained by reason of the wide differences in temperature of the cooling chamber and the interior of the predryed product. This difference in temperature facilitates the migration of moisture from the warm, inside parts of the product to the outer layers, providing a better partial dehydration of inner layers of the product.

The cooling step prior to quick-freezing as described above, combined with the dehydration step gives an excellent result. The frozen products retain their shapes and do not lose a substantial amount of juices even after thawing.

*Example I*

A 100-pound batch of fresh cherries is immersed in a water bath maintained at 0° C. or slightly below by keeping a thin layer of ice on the surface. The batch is left in this bath for such period of time that all portions of each cherry in the whole mass has reached a temperature of 0° C. This time will vary with the initial temperature of the cherries and may require about two or three hours. The temperature of the product is thereby uniformly reduced to a temperature just above the freezing temperature of the product without any freezing of the product during the cooling operation. The cherries are then subjected to a mechanical seeding or pitting operation under conditions wherein the cherries do not warm up above 4° C., i.e., in a cold chamber by preference at 0° C. They are then quick-frozen by the usual methods, a much shorter time now being required for freezing.

*Example II*

Cherries, strawberries, or high-water content vegetables are predried by passing them through a conventional band or tunnel dryer, so that 10 to 20% of their moisture content has been removed. The dehydrated product is then placed in a cold chamber maintained at 0° C. or silghtly below, caution being taken that no freezing of any portion of the product is obtained until the temperature of each portion of the entire mass has reached 0° C. Generally, about four to six hours, or overnight, depending upon the specific product and the size of the mass, is required. The product is then quick-frozen.

While the examples of practice have illustrated the process as adapted to fruits and berries, it will be understood that the invention may be usefully applied to meats and fish, as well as other food products which may be preserved by freezing.

I claim:

1. In a process for the quick-freezing of foods having moisture contained in a cellular structure, the improvement which comprises the additional step of precooling the food product to be frozen at a temperature between 0° C. and its freezing temperature until the whole mass of the product reaches a temperature in said range and sufficient time has elapsed to permit water to migrate from the food cells through the cell membranes so that the cells can expand slowly during subsequent freezing without being ruptured, prior to subjecting any portion of said product to a freezing operation, and then quick-freezing the entire mass of the product without substantial rise in temperature.

2. The process of claim 1 wherein the food products are partially dehydrated before the precooling operation.

3. The process of claim 1 wherein the precooling operation is conducted in a liquid bath.

4. The process of claim 1 wherein the food to be frozen is selected from the group consisting of fruits, berries, and high-moisture content vegetables.

5. The process of claim 3 wherein said bath has approximately the same specific gravity as the juice in the product to be treated.

6. A process for preserving fresh cherries comprising: cooling said cherries at a temperature within the range of from 0° C. to the freezing temperature of said cherries until the entire mass of each cherry uniformly reaches a temperature within said range without freezing any portion thereof, seeding said cherries while maintaining them at a temperature within said range, then quick-freezing said seeded cherries without substantial rise in temperature.

References Cited in the file of this patent

UNITED STATES PATENTS

| 2,103,925 | Zarotschenzeff | Dec. 28, 1937 |
| 2,477,605 | Howard et al. | Aug. 2, 1949 |
| 2,520,891 | Rivoche | Aug. 29, 1950 |
| 2,529,959 | Pedersen | Nov. 14, 1950 |
| 2,788,281 | Guadagni | Apr. 9, 1957 |
| 2,824,810 | Guadagni | Feb. 25, 1958 |
| 2,832,690 | Brunsing et al. | Apr. 29, 1958 |
| 2,938,802 | Miller | May 31, 1960 |

FOREIGN PATENTS

| 617,857 | Great Britain | Feb. 11, 1949 |
| 525,502 | Canada | May 29, 1956 |
| 134,154 | Australia | Sept. 6, 1949 |